UNITED STATES PATENT OFFICE.

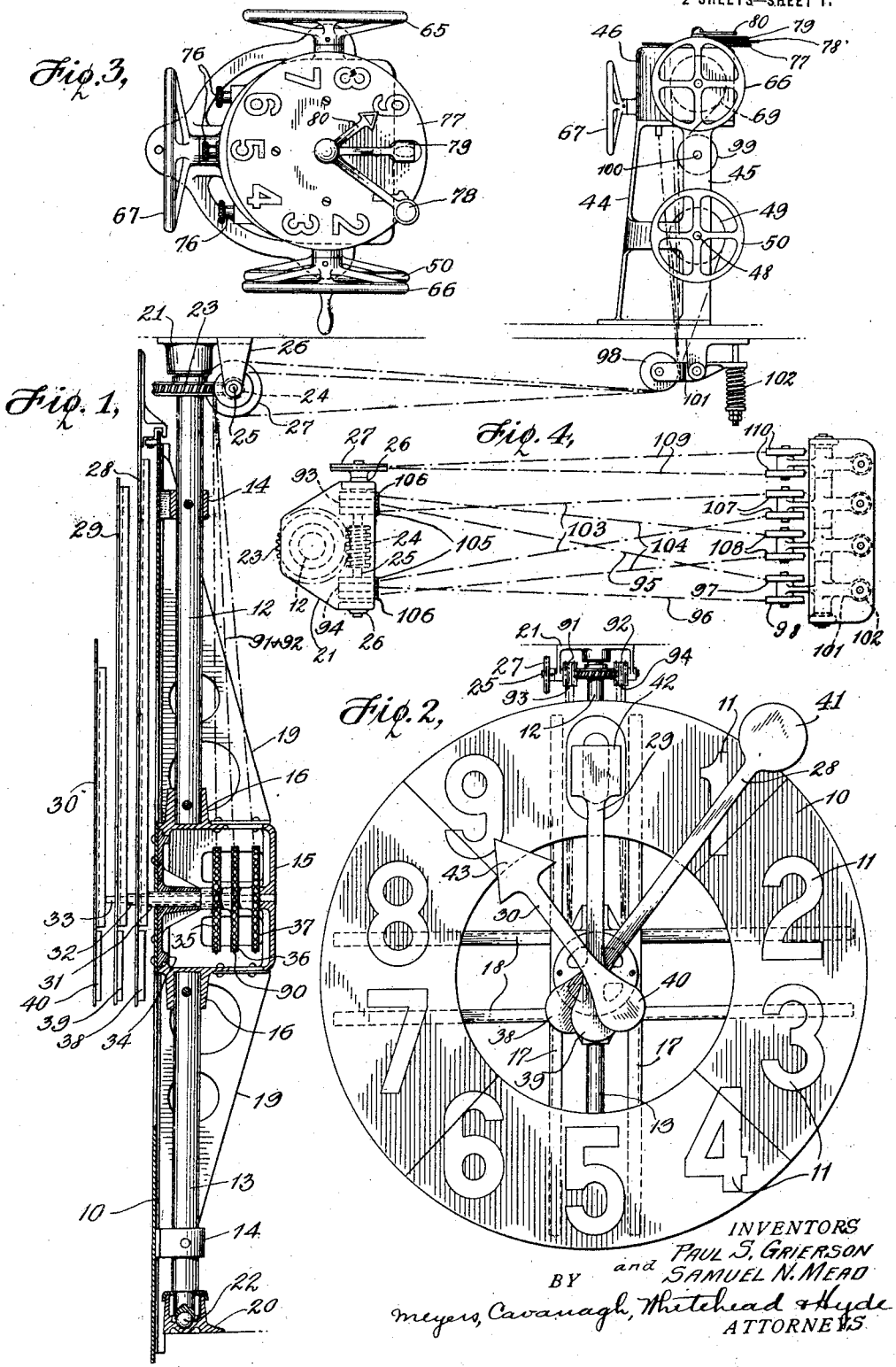

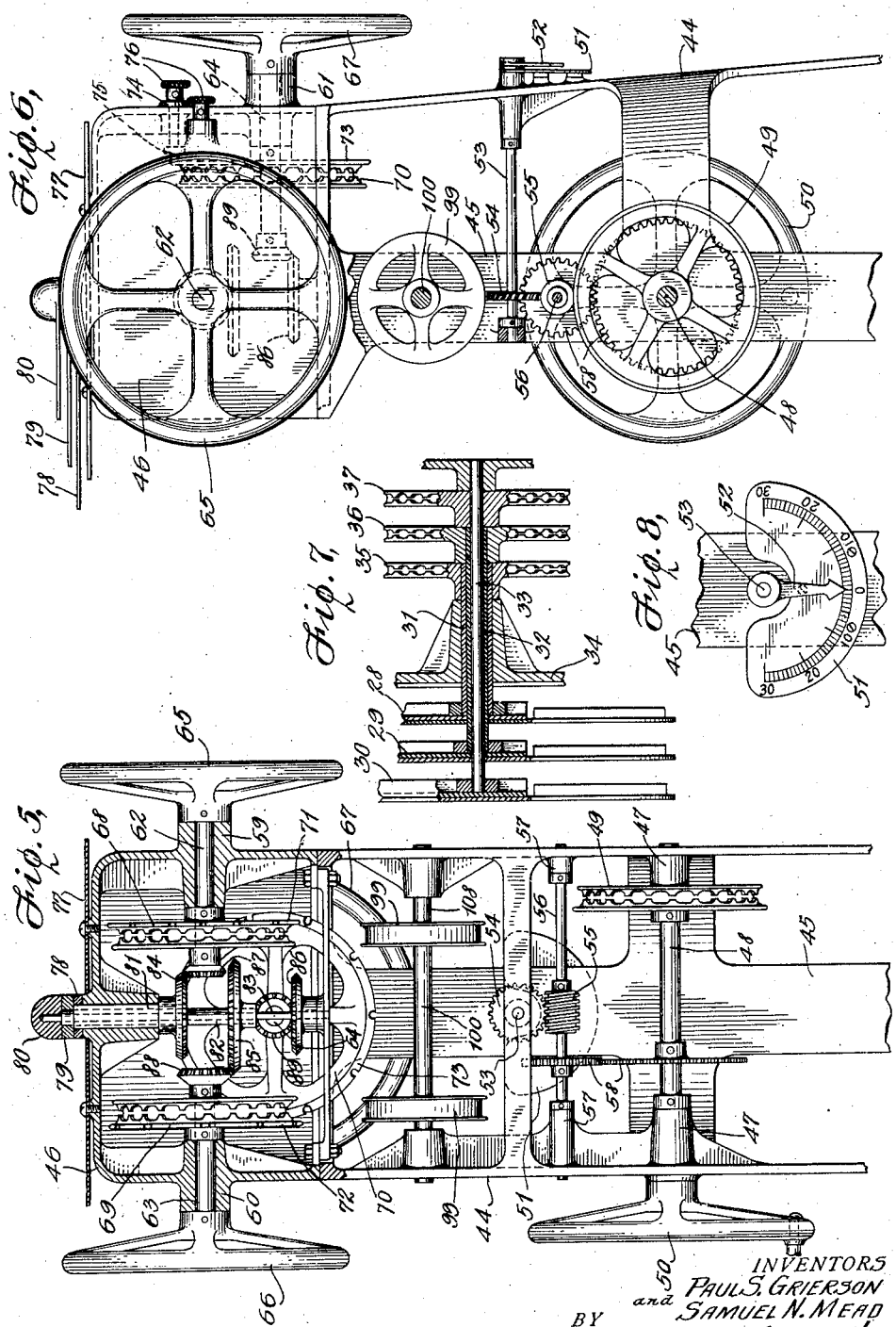

PAUL S. GRIERSON, OF SOUTH ORANGE, NEW JERSEY, AND SAMUEL N. MEAD, OF BROOKLYN, NEW YORK, ASSIGNORS TO CHAS. CORY & SON, INCORPORATED, OF NEW YORK, N. Y., A CORPORATION OF NEW YORK.

SHIP SIGNALING APPARATUS.

1,405,839.      Specification of Letters Patent.      Patented Feb. 7, 1922.

Application filed August 2, 1921. Serial No. 489,372.

*To all whom it may concern:*

Be it known that we, PAUL S. GRIERSON and SAMUEL N. MEAD, citizens of the United States, and residents of South Orange and Brooklyn, respectively, in the counties of Essex and Kings, respectively, and States of New Jersey and New York, respectively, have invented certain new and useful Improvements in Ship Signaling Apparatus, of which the following is a specification.

This invention relates to a signaling apparatus and more particularly to a ship signaling apparatus; and has special reference to the provision of an apparatus of this type adapted for displaying signals on one vessel, as for example, on the flagship of a squadron, the signals being so displayed as to be efficiently viewable from the other vessels of the squadron.

A prime desideratum of our present invention comprehends the provision of a ship signaling means for indicating or displaying information intended to be conveyed or transmitted to vessels steaming nearby, the means for displaying the information being controllable from a point on the ship remote from the said displaying means. In displaying information for transmission from one vessel to a number of others moving in squadron formation and thus occupying positions in a field embracing sectors to both sides of the fore and aft line of the vessel, it is desired that the information displayed for transmission be viewable distinctly and unmistakably from all other vessels in the squadron. Where the means for displaying the intelligence or information takes the form of an indicating dial and pointer mechanism it is desired to position the mechanism so as to be viewable from the adjoining vessels positioned at a variety of angles without introducing errors of observation due to such factors as parallax. Where the information to be conveyed, for example, consists of the range of the enemy fleet, accuracy of observation is, of necessity, of paramount consideration. An efficient apparatus for accomplishing these ends has been found to include a dial and pointer mechanism arranged for movement, such as an oscillating movement, through angles to both sides of the fore and aft line of the vessel to present the dial substantially full face to the other vessels of the squadron.

One of the difficulties in apparatus of this nature, especially where the means for controlling actuation of the dial and pointer mechanism comprises remotely controlled instrumentalities including a mechanical transmission system, has been found to lie in the provision of a construction in which motion or oscillation of the dial means could be obtained without disturbing a previously assumed setting or positioning of the indicating pointer means on the dial. A desideratum, therefore, is the provision of a signaling apparatus of this nature in which the dial means may be oscillated without change of a pointer setting and in which the pointer means movable over the dial may be operated in any and all positions of the dial and in which both the motion of the dial and pointer means is efficiently controlled from a remote point on the vessel to effect the display and observation of information with that desired accuracy essential in an apparatus of this nature and our present invention has for its prime object the provision of such a signaling apparatus.

To the accomplishment of the foregoing and such other objects as may hereinafter appear, our invention consists in the elements and their relation one to the other, as hereinafter particularly described and sought to be defined in the claims, reference being had to the accompanying drawings which show a preferred embodiment of our invention and in which:

Figure 1 is a side elevational view with parts in cross section of the display mechanism and the transmitter connected thereto for controlling the operation thereof, Figure 2 is a front face view of the indicating mechanism drawn to a reduced scale, Figure 3 is a top plan view of the transmitter, Figure 4 is a top plan view of the display mechanism and showing its connection to the transmitter.

Figure 5 is a rear end elevational view with parts broken away and other parts shown in section of the transmitter, Figure 6 is a side elevational view of the transmitter with parts broken away, and Figures 7 and 8 are views of details.

For the purpose of displaying information or intelligence to be conveyed to adjoining vessels, we provide a dial and pointer mechanism adapted to be moved into a variety of indicating positions viewable from both sides of the vessel. To this end we provide a dial 10 which may be constructed in the form of an annulus to reduce the effect of wind pressure, the dial 10 being provided on its face with the numerical indications 11, the dial being made of a size which may range upwards of 10 feet in diameter to permit visibility of the numerical designations from points distant from the vessel. The dial 10 is supported on the alined shafts 12 and 13 by means of the top and bottom stiffening brackets 14, the alined shafts 12 and 13 being rigidly connected together by means of the casing structure 15 provided with the integral bosses 16 fixedly receiving adjacent ends of the said shafts 12 and 13. The dial structure may be strengthened by the provision of vertical beams 17 and cross beams 18 to which the dial 10 is attached, bracing plates 19 being further provided for this purpose, such bracing plates rigidly connecting the beams 17 and 18 to the central casing structure 15.

The dial 10 and its supporting structure is intended for movement through angles on both sides of the fore and aft line of the vessel and to this end the dial is mounted for oscillating movement about a vertical axis. The vertical axis of rotation is provided by the alined shafts 12 and 13, the said shafts being mounted in opposed bearing brackets 20 and 21, the bearing brackets providing ball bearing journal boxes 22 the said brackets 20 and 21 being attached to any convenient support on the deck of the vessel such as, for example, a mast (not shown). For the purpose of rotating or oscillating the dial, the shaft 12 is provided preferably adjacent its upper end with a worm wheel 23 meshing with a worm 24 fixed to a worm shaft 25, the worm shaft 25 being mounted in opposed bearings 26 provided by the bracket 21, a sprocket wheel 27 being fixed to one end of the shaft 25 and being adapted for connection to operating means hereinafter to be described in detail for effecting rotation in opposite directions of the shaft 25, rotation of such shaft in turn effecting oscillating motion of the dial 10 in a manner as will be apparent. Mounted for movement over the dial plate 10 we provide a plurality of indicating pointers 28, 29 and 30 respectively, the said indicating pointers being adapted for independent rotation about the dial and being adapted to be selectively positioned over the numerical indications of the said dial. The pointers 28 to 30 are mounted on concentric shafts 31, 32 and 33 respectively, as shown particularly in Figures 1 and 7 of the drawings, the said shafts being suitably mounted in a bearing provided by the casing cover 34, the said cover 34 being fixedly attached to the casing structure 15. For the purpose of independently rotating the pointers 28 to 30 we provide a plurality of independently operable sprocket wheels 35, 36 and 37, the sprocket wheels being fixed to the shafts 31 to 33 respectively, as shown particularly in Figure 7 of the drawings. The pointers 28 to 30 may be provided, for the purpose of balancing the same, with the weighted elements 38, 39 and 40 mounted on the short arms of the said pointers. It will be apparent from this construction that the dial and the pointer means comprising the indicating mechanism is movable as a body from side to side of the vessel, with rotation of the pointers on the dial being effected by selective operation of the sprocket wheels 35 to 37.

It is desired to provide a single indicating dial to transmit such information as the range of a vessel and to this end the plurality of pointers 28 to 30 are given distinctive configurations easily distinguishable from one another, the distinctive configurations being intended to indicate the desired digital arrangement of the numerals 11. Thus the pointer 28 is provided with a circular end 41, the pointer 29 with a squared shaped end 42 and the pointer 30 with an arrow shaped end 43, these designations being intended to indicate sucessive digital values. Thus, observation of the dial and pointers shown in Figure 2 may indicate to the observer that the range observation to be transmitted is 10,900 yards. By the provision of this means a single dial may be thus utilized for the transmission of a variety of indications.

For the purpose of controlling the oscillation of the dial and the selective rotation of the pointers thereon we provide a transmitter located at a point remote from the indicating mechanism. The operating elements of the transmitter are supported by a suitable stand 44 providing the standards 45 and the casing 46. Mounted in the opposed bosses 47 formed preferably integrally with opposed standards 45 is a shaft 48 to which shaft is fixed a sprocket wheel 49, the shaft being provided with an operating hand wheel 50 fixed at an end thereof. The sprocket wheel 49 is intended for connection to the sprocket wheel 27, as will be described more in detail hereinafter, rotation of the hand wheel 50 thus being adapted to effect oscillation of the dial structure 10. For the purpose of indicating to the operator the angular position of the dial structure 10 we provide the segmental dial 51 mounted on the front standard 45, a movable pointer 52 cooperating with the segmental dial being connected to a shaft 53 mounted in the standard 45, the said shaft being provided with a worm wheel 54 fixed thereto, rotation of the worm wheel and the pointer being obtained by means of the worm 55 attached to shaft 56, the said shaft 56 being mounted in suitable bearings 57 on the standards 45, shafts 48 and 56 being supplied with meshing spur gears 58. It will be apparent from this construction that rotation of the hand wheel 50 will move the pointer 52 over the segmental dial 51 to indicate the angular positioning of the dial structure 10.

The casing 46 of the transmitter is provided with preferably integral bosses 59, 60 and 61 providing bearings for the operating shafts 62, 63 and 64 respectively. Fixed to one end of the shafts 62 to 64 are the operating hand wheels 65, 66 and 67, the shafts 62 to 64 being further provided with the sprocket wheels 68, 69 and 70 respectively, these sprocket wheels being intended to be connected to the sprocket wheels 35 to 37 respectively for independent rotation of the pointers 28 to 30 respectively in a manner as will be described more in detail hereinafter. For the purpose of locking the indicating pointers in any of its positions over the dial, the sprocket wheels 68 to 70 respectively are provided with notched disks 71, 72 and 73 respectively, the notched disks cooperating with the locking elements 74 slidably mounted in the front wall of the casing 46. Each of these locking elements may comprise a locking pin or bolt 75 adapted to be received in any of the notches of the notched disks 71 to 73, the said locking pins being movable to released or unlocking position by means of the finger knobs 76 forming part of the locking elements.

For the purpose of indicating to the operator controlling the transmitter the positions or settings of the pointers 28 to 30 on the dial 10, the transmitter may be provided with a corresponding dial and pointer means operable in synchronism with the pointers 28 to 30. To this end we may provide a dial 77 fixed to the upper wall of the casing 46, pointers 78, 79 and 80 being provided for independent rotation over the dial 77, the pointers 78 to 80 corresponding in configuration and in position to the indicating pointers 28 to 30. The pointers 78 to 80 are mounted on the concentric shafts 81, 82 and 83 for independent movement, the shafts 81 to 83 being provided with the bevel gears 84, 85 and 86 respectively meshing with the bevel gears 87, 88 and 89 respectively, the said latter bevel gears being fixed to the operating shafts 62, 63 and 64 respectively.

A desideratum of our present invention, as hereinbefore referred to, contemplates the provision of a transmission means connecting the transmitter 44 with the indicating dial and pointer mechanism for effecting oscillation of the dial and rotation of the pointers in response to the operation of the transmitter, with movement of the pointers and dial selectively effected in such manner that any desired setting of the pointers may be effectuated or accomplished in any and all positions of the dial and so that, furthermore, motion of the dial be obtainable without changing or disturbing a desired setting of the pointers. To accomplish these ends we preferably provide a chain transmission means so connected and related to the transmitter and the indicating mechanism that any changes taking place in the transmission due to that relative movement between the indicating mechanism and the transmitter incident to oscillation of the dial will not affect relative rotation of the pointers with respect to the dial. To this end we provide a plurality of endless drive chains connecting the sprocket wheels 68, 69 and 70 to the sprockets 35, 36 and 37 respectively, the connection being such as to provide two symmetrically arranged lengths in each of the endless chains, means being further provided to equally compensate for changes taking place in the two chain lengths when the dial is oscillated, this arrangement being effective for retaining the desired synchronism between the transmitter and the indicating pointers during oscillation of the said dial. This chain system of transmission is shown in Figures 1, 2 and 4 of the drawings. For controlling the movement of the sprockets 35 to 37 we provide three independent endless chains, these chains being similar in construction and arrangement. A description of one of the endless chains will be given. Trained over the intermediate sprocket 36 is the chain 90, opposed bights of the chain being led from the sprocket to and over the guide pulleys 93 and 94 rotatably mounted on shaft 25, providing two symmetrically arranged vertical lengths 91 and 92 (Figure 2). From the guide pulleys 93 and 94, the chain bights extend to and under the opposed pulleys or guide wheels 97 and 98, the lengths 95 and 96 being thus provided. The remaining portion of the chain 90 is trained over the sprocket wheel 69, a guide wheel 99 mounted on the shaft 100 movable in suitable bearings in the standards 45 being provided for further guiding the bights or lengths of the chain. The provision of the guide wheels 93 and 94 and their location adjacent the pivotal axis of the dial structure 10 and the symmetrical arrangement of the lengths 91 and 92 of the endless chain effects a construction in which these lengths are equal and in which movement or oscillation of the dial produces equal changes in length of the said chain lengths 91 and 92, this construction, when the sprocket 69 is locked in position, permitting oscillation of the dial without rotation of the sprocket 36. For the purpose of taking up or compensating for the changes in lengths of the bights of the chain incident to rotation of the dial structure 10, we construct the guide wheels 97, 98 in the form of tensioning elements, the said guide wheels being mounted for this purpose on a common lever 101, the said lever being tensioned as by means of the spring pressed plunger element 102. The chain lengths 95 and 96 are both guided under the tensioned guide wheels 97 and 98, these guide wheels equally compensating for equal changes in length of the bights 95 and 96 of the chain. Similarly, rotation of the sprockets 35 and 37 is controlled by means of the chains 103 and 104 respectively, these chains being, in turn, connected to the sprocket wheels 68 and 70 respectively. For the purpose of guiding the chains 103 and 104 the sets of guide wheels 105 and 106 rotatably mounted on the shaft 25 may be provided, the independent spring tensioning sets of guide wheels 107 and 108 being further provided for these endless chains. For the purpose of effecting rotation of the dial structure 10 and more specifically for the purpose of operating the sprocket 27 on the shaft 25, we provide the endless chain 109 guided by the tension wheels 110 and connected to the sprocket wheel 49, as shown in Figure 1 of the drawings.

The installation and operation of our ship signaling apparatus will be, in the main, apparent from the above detailed description thereof. By rotation of the hand wheel 50 in either direction the dial structure 10 with the indicating pointers and sprocket wheels is oscillated through angles on both sides of the fore and aft line of the vessel, the positioning of the dial structure 10 being indicated to the operator by the pointer 52 mounted on the transmitter structure. For effecting selective movement of the plurality of indicators 28 to 30 the hand wheels 65 to 67 are selectively operated. The indicating pointers may be set in any desired position, means being provided for this purpose in the transmitter for locking the positioning of the hand wheels 64 to 66. The settings of the pointers on the dial 10 may be indicated to the operator by the corresponding settings of the indicators 78 to 80 movable over the dial plate 77 on the transmitter structure. The endless chain transmission connecting the transmitter with the dial mechanism is so constructed and arranged as to permit oscillating movement of the dial without changing or disturbing a desired setting of the indicating pointers, the pointers being movable to any position in any and all positions of the said dial.

While we have shown our device in the preferred form, it will be obvious that many changes and modifications may be made in the structure disclosed without departing from the spirit of the invention, defined in the following claims.

We claim:

1. A signaling apparatus comprising a dial mounted for movement to assume any of a plurality of indicating positions, pointer means movable over the dial to assume any of a plurality of settings, provisions for moving the dial, elements for moving the pointer means and remote control instrumentalities for selectively operating the said provisions and the said elements for effecting movement of either the dial or the pointer means without disturbing any of the positions or settings assumed by the other.

2. A ship signaling apparatus comprising a dial mounted for oscillation about a vertical axis to assume any of a plurality of indicating positions viewable from the starboard and port sides of the ship, pointer means movable over the dial to assume any of a plurality of settings, provisions for oscillating the dial, elements for moving the pointer means and remote control instrumentalities for selectively operating the said provisions and the said elements for effecting movement of either the dial or the pointer means without disturbing any of the positions or settings assumed by the other.

3. A signaling apparatus comprising a dial mounted for movement to assume any of a plurality of indicating positions, pointer means movable over the dial to assume any of a plurality of settings, provisions for moving the dial, elements for moving the pointer means and remote control instrumentalities for selectively operating the said provisions and the said elements, said instrumentalities including a transmitter positioned at a distance from the said dial and pointer means and a mechanical transmission means operatively associated with said provisions and elements, selective operation of the provisions and the elements effecting movement of either the dial or the pointer means without disturbing any of the positions or settings assumed by the other.

4. A signaling apparatus comprising a dial mounted for movement to assume any of a plurality of indicating positions, a plurality of pointers having distinctive indicating characteristics independently movable over the dial to assume any of a plurality of settings, provisions for moving the dial, elements for moving the pointers and remote control instrumentalities for selectively operating the said provisions and the said elements for effecting movement of either the dial or the pointers without disturbing any of the positions or settings assumed by the other.

5. A signaling apparatus comprising a dial mounted for movement to assume any of a plurality of indicating positions, pointer means mounted on the dial for movement therewith and for rotation with respect thereto, provisions for moving the dial, elements carried by the dial for rotating the pointer means and remote control instrumentalities connected to said provisions and to the said elements for independently operating the same, the said instrumentalities including a remotely positioned transmitter and a chain transmission means.

6. A ship signaling apparatus comprising a dial mounted for oscillation about a vertical axis to assume any of a plurality of indicating positions viewable from the starboard and port sides of the ship, pointer means mounted on the dial for movement therewith and for rotation with respect thereto, provisions for oscillating the dial, elements carried by the dial for rotating the pointer means and remote control instrumentalities connected to said provisions and to the said elements for independently operating the same, the said instrumentalities including a remotely positioned transmitter and a chain transmission means.

7. A signaling apparatus comprising a dial mounted for movement to assume any of a plurality of indicating positions, pointer means mounted on the dial for movement therewith and for rotation with respect thereto, provisions for moving the dial, sprocket means carried by the dial for rotating the pointer means, a transmitter, chain transmission means connecting the transmitter with the sprocket means, the connection being such that motion of the dial and its sprocket means relative to the transmitter with resulting motion of the transmission chain will not disturb the position of the pointer means relative to the said dial.

8. A signaling apparatus comprising a dial mounted for movement to assume any of a plurality of indicating positions, pointer means mounted on the dial for movement therewith and for rotation with respect thereto, provisions for moving the dial, sprocket means carried by the dial for moving the pointer means, a transmitter, transmission means connecting the transmitter with the sprocket means, the said transmission means comprising a chain, the chain being symmetrically trained over the sprocket means to provide for two lengths or bights of the chain and for equal changes in length of the bights during motion of the dial and sprocket means and tensioning means operative on the said chain transmission means for compensating for the said changes in length thereof whereby motion of the dial into its plurality of positions will not disturb a set position of the pointer means relative to the said dial.

9. A signaling apparatus comprising a dial mounted for movement to assume any of a plurality of indicating positions, pointer means mounted on the dial for movement therewith and for rotation with respect thereto, provisions for moving the dial, sprocket means carried by the dial for moving the pointer means, stationary guide means, a transmitter, transmission means connecting the transmitter with the sprocket means, the said transmission means comprising a chain, the chain being guided over the said stationary guide means and being symmetrically trained over the sprocket means to provide for two equal bights or lengths between the sprocket means and the guide means with motion of the dial and sprocket means effecting substantially equal changes in length of the said bights of the chain and tensioning means operative on the said chain transmission means for compensating for the said changes in length thereof whereby motion of the dial into its plurality of positions will not disturb a set position of the pointer means relative to the said dial.

10. A signaling apparatus comprising a dial mounted for movement to assume any of a plurality of indicating positions, pointer means mounted on the dial for movement therewith and for rotation with respect thereto, said pointer means comprising a plurality of pointers having distinctive indicating characteristics, with the pointers concentrically mounted on the dial, provisions for moving the dial, sprocket means carried by the dial for moving the pointer means, a transmitter, transmission means connecting the transmitter with the sprocket means, the said transmission means comprising a chain, the chain being symmetrically trained over the sprocket means to provide for two lengths or bights of the chain and for equal changes in length of the bights during motion of the dial and sprocket means and tensioning means operative on the said chain transmission means for compensating for the said changes in length thereof whereby motion of the dial into its plurality of positions will not disturb a set position of the pointer means relative to the said dial.

11. A signaling apparatus comprising a dial mounted for movement to assume any of a plurality of indicating positions, pointer means movable over the dial to assume any of a plurality of settings, provisions for moving the dial, elements for moving the pointer means, a remotely positioned transmitter connected to the said provisions and elements, means on the transmitter for controlling operation of the provisions, instrumentalities on the transmitter for controlling operation of said elements and means for locking the said instrumentalities to lock the pointer means in any of its plurality of settings.

Signed at New York, in the county of New York and State of New York, this 27th day of July, A. D. 1921.

PAUL S. GRIERSON.
SAMUEL N. MEAD.